Patented Mar. 5, 1929.

1,704,218

UNITED STATES PATENT OFFICE.

FRITZ ROTHE, OF AACHEN, AND HANS BRENEK, OF PORZ, NEAR COLOGNE, GERMANY, ASSIGNORS TO THE FIRM: RHENANIA VEREIN CHEMISCHER FABRIKEN, A. G., OF COLOGNE, GERMANY.

PROCESS FOR PREPARING FERTILIZERS.

No Drawing. Application filed June 11, 1925, Serial No. 36,549, and in Germany June 23, 1924.

For the preparation of phosphoric acid fertilizers many proposals have already been suggested for the conversion of the phosphoric acid, existing in an insoluble form in the natural phosphorites, into a form easily taken up by plants by subjecting the phosphorites to a "glowing" or heating process after mixing them with various additions such as alkali compounds, alkaline earth compounds, silicates and the like. The addition of the alkaline earth compounds is intended to convert the tri-calcium phosphate in the phosphorites into the phosphoric acid combination with a higher percentage of lime, for instance in the form of a tetra compound or combination such as is assumed to exist in "Thomas" slag. According to the known process of "Mathesius" there is added to the phosphorites such quantities of lime and silicic acid that the combination $5CaO.P_2O_5.SiO_2$ is produced. In many cases there is added according to the known processes an addition of alkali compounds as a flux medium, whereby, in addition to the carbonates, mention is also made of the sulphates and chlorites of the alkalies.

Now whereas processes have been successfully carried out with the use of alkali carbonates or silicates, other alkali-salts, as for instance, the far cheaper alkali sulphates have found no practical application. This is due to the fact that when using alkali sulphates, especially of the potash compounds, under the same conditions as laid down for the use of the carbonates or silicates, with a completely insufficient yield easier soluble phosphoric acid very considerable losses of alkali occur due to evaporation. Apart from the material loss, especially when using the valuable potash salts, the lining or lagging of the kilns or furnaces is strongly attacked by the alkali vapour and suffers an unusual degree of wear and tear.

Moreover all these processes work without any recognizable chemical reaction, in a purely empirical manner and yield products with about 15% citrate or citric acid soluble phosphoric acid.

A further process has also been described according to which the addition of alkali does not serve as a flux medium but the alkali used as carbonate in contradistinction to the other known processes participates directly in the formation of an alkali calcium phosphate in such a manner that by the addition of the silicic acid there is bound from the tri-calciumphosphate a molecule of CaO in the form of calciumorthosilicate, and the alkali metal oxide takes its place under direct binding with the phosphoric acid, presumably in the manner of the following equation:

$2(Ca_3(PO_4)_2) + 2(Na_2CO_3) + SiO_2 = 2(Na_2Ca_2(PO_4)_2) + (2CaO.SiO_2) + 2CO_2$.

Hence in contradistinction to the process that has hitherto become known there occurs no formation of a phosphoric acid combination rich in lime, but the lime phosphoric acid combination occurring in the phosphorites has still lime withdrawn from it under formation of an alkali calcium phosphate.

Also according to this reaction, however, it is not possible, though observing the known conditions, to replace the carbonate by other alkali salts. The existing phosphoric acid is only converted to the extent of hardly 70% into a form soluble in citrate or citric acid and, consequently, considerable losses in alkali occur.

Now it has been found that it is possible to completely convert the phosphoric acid into a form entirely soluble in citrate or citric acid and to avoid the losses of alkali caused by evaporation, if the addition of silicic acid be so calculated that to one molecule alkali metal oxide there is used at least one molecule of silicic acid and at the same time the "glowing" or heating process is carried out in the presence of steam, and if, furthermore, care be taken that the silicic acid used be bound as orthosilicate $2CaO.SiO_2$, if necessary with the addition of limestone or the like.

Under these conditions at a temperature of 900–1000° a perfect decomposition of the alkali salts is obtained, without any evaporation of these taking place. The reaction takes place, for example with the use of potassium sulphate, probably in such wise that firstly sulphate and silicic acid react as follows:

$K_2SO_4 + SiO_2 = K_2SiO_3 + SO_3$.

The potash meta silicate thus formed is then converted without any increase in temperature being necessary with the triple basic phosphoric acid lime, under formation of potash calcium phosphate, $K_2Ca_2(PO_4)_2$. When completed the process may be assumed to be as follows:

$Ca_3(PO_4)_2 + K_2SO_4 + SiO_2 + CaCO_3 =$
$K_2Ca_2(PO_2)_2 + (2CaO.SiO_2) + SO_3 + CO_2.$

As this equation shows, by mixture of phosphorite with alkali salts, silicic acid and alkaline earth compounds such as carbonic acid lime, caustic lime, carbonate of magnesium, oxide of magnesium, etc. under the conditions as given in the above equation, whilst the silicic acid present in the raw phosphate per se and the alkaline earth combinations not bound in phosphate must be taken into consideration, on "glowing" or heating in the presence of steam at temperatures of 1000°, a loose sintered product which contains the phosphoric acid used in a form soluble in citrate is obtained.

Now if use be made of potassium sulphate, there is then obtained a fertilizer of excellent nature or composition, as the whole of its phosphoric acid is present in a citrate soluble form and the lime is not, as with the otherwise usual potash fertilizers, bound in acids prejudicial to the plants.

It is remarkable and astonishing that it does not prove successful to obtain by "glowing" or heating without the presence of steam a suitable product, also when all other conditions corresponding to the above mentioned reaction equation are complied with. An increase of temperature above 1000° is also of no use in this case as then an evaporation supervenes of the alkali combination in an unaltered form. If on carrying out the process the material to be burnt is heated direct by a steam generating flame, for example by water gas heating, then it is according to the hydrogen percentage of the heating gas either entirely unnecessary to conduct further quantities of steam over the material to be burnt, or else only to supply small complementary quantities.

The present invention shows a notable technical and economic effect in the production of phosphoric acid fertilizers according to the "glowing" or heating process. From the technical point of view it may be pointed out that the products obtained have an extraordinarily high precentage of phosphoric acid, and up to 30% citric soluble phosphoric acid that consequently in comparison with other processes the masses to be moved and heated in course of manufacture, represent the smallest possible quantities, and that according to the present process almost quantitative yields are obtained.

From the economic point of view an unusually good effect is obtained, due to the fact that low grade phosphorites, containing much silicic acid, which for example would be of no use for the manufacture of superphosphate, can be used with advantage whilst cheaper materials, as for instance alkali sulphates, can be used as alkali carriers.

In the process the action of the silicic acid can be replaced by argillaceous earth or iron oxide and on calculating the necessary equation due consideration must be given to the aluminium oxide and iron oxide existing in the natural phosphorites.

The acid gases generated during the carrying out of the process can be turned to account according to the known process.

*Working example.*

100 parts of a North African raw phosphate with 39.7% $P_2O_5$, 47.0% CaO bound in phosphoric acid, 5,61% CaO not bound in phosphoric acid and 0,56% $SiO_2$ were thoroughly mixed with 55 parts of technical potassium sulphate with a content of 48% $K_2O$, 15,5 parts quartz and 20 parts lime stone. The mixture was "glowed" or heated at a temperature of about 1000° steam being guided over it. The heated product contained:

27.46% total phosphoric acid 26.61% citrate soluble phosphoric acid (soluble in ammoniacal ammoncitrate solution according to Petermann) that is to say 97% recovery of the total phosphoric acid.

18.47% potash.

The sulphuric acid was practically entirely driven out of the product, and the material separated off only still contained 0.48% $SO_3$.

What we claim and desire to secure by Letters Patent of the United States is:

1. A process for preparing fertilizers, comprising forming a mixture of mineral phosphorites which mixture contains for every molecule of $P_2O_5$ about one molecule of alkali metal oxide in the form of its salts and at least one molecule of silica, and for every molecule of silica such quantities of lime that in addition to an alkali calcium phosphate, calcium orthosilicate may be formed, and subjecting said mixture to a heating at a temperature of at least 900° C. in the presence of steam.

2. A process for preparing fertilizers, comprising forming a mixture of mineral phosphorites which are rich in lime and silica, which mixture contains for every molecule of $P_2O_5$ about one molecule of alkali metal oxide in the form of its salts and at least one molecule of silica and for every molecule of silica such quantities of lime that in addition to an alkali calcium phosphate, calcium orthosilicate may be formed, and subjecting said mixture to a heating at a temperature of at least 900° C. in the presence of steam.

3. A process for preparing fertilizers, comprising forming a mixture of mineral phosphorites which mixture contains for every molecule of $P_2O_5$ about one molecule of alkali metal oxide in the form of its salts and at least one molecule of such an equivalent of silica which is able to bind CaO and for every molecule of such an equivalent of silica such quantities of CaO that in addition to an alkali calcium phosphate a calcium compound corresponding to calcium orthosilicate may be formed, and subjecting said mixture to a heating at a temperature of at least 900°C. in the presence of steam.

4. A process for preparing fertilizers, comprising forming a mixture of mineral phosphorites which mixture contains for every molecule of $P_2O_5$ about one molecule of alkali metal oxide in the form of its salts and at least one molecule of silica and of such equivalents of silica which are able to bind CaO and for every molecule of silica and its equivalents such quantities of CaO that in addition to an alkali calcium phosphate, calcium orthosilicate and other calcium compounds corresponding to calcium orthosilicate may be formed, and subjecting said mixture to a heating at a temperature of at least 900° C. in the presence of steam.

5. A process for preparing fertilizers, comprising forming a mixture of mineral phosphorites which mixture contains for every molecule of $P_2O_5$ about one molecule of alkali metal oxide in the form of its sulphate and at least one molecule of silica and for every molecule of silica such quantities of lime that in addition to an alkali calcium phosphate calcium orthosilicate may be formed and subjecting said mixture to a heating at a temperature of at least 900° C. in the presence of steam.

Dr. FRITZ ROTHE.
Dr. HANS BRENEK.